(12) United States Patent
Knopp et al.

(10) Patent No.: US 8,038,162 B2
(45) Date of Patent: Oct. 18, 2011

(54) JOINT UNIT, PREFERABLY FOR MOUNTING THE CHASSIS CONTROL ARM OF A MOTOR VEHICLE

(75) Inventors: Sören Knopp, Ostercappeln (DE); Manfred Buhl, Bissendorf (DE); Ralf Kunze, Bad Essen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 130 days.

(21) Appl. No.: 12/438,594

(22) PCT Filed: Aug. 9, 2007

(86) PCT No.: PCT/DE2007/001420
§ 371 (c)(1),
(2), (4) Date: Feb. 24, 2009

(87) PCT Pub. No.: WO2008/022620
PCT Pub. Date: Feb. 28, 2008

(65) Prior Publication Data
US 2010/0013181 A1    Jan. 21, 2010

(30) Foreign Application Priority Data
Aug. 25, 2006   (DE) .......................... 10 2006 039 863

(51) Int. Cl.
*B62D 7/16* (2006.01)
(52) U.S. Cl. ..... 280/93.511; 280/124.106; 280/124.111; 403/77; 403/122; 403/149

(58) Field of Classification Search ............. 280/93.511, 280/93.51, 124.106, 124.111, 124.11; 403/76, 403/77, 116, 117, 122, 149
See application file for complete search history.

(56) References Cited

U.S. PATENT DOCUMENTS

| 7,221,265 | B2 * | 5/2007 | Bjorkgard | 340/440 |
| 7,367,742 | B2 * | 5/2008 | Brunneke et al. | 403/122 |
| 7,708,488 | B2 * | 5/2010 | Kunze et al. | 403/149 |

FOREIGN PATENT DOCUMENTS

| DE | 102004055961 | 5/2006 |
| WO | WO 2006/110049 | 10/2006 |

* cited by examiner

*Primary Examiner* — Eric Culbreth
(74) *Attorney, Agent, or Firm* — McGlew and Tuttle, P.C.

(57) ABSTRACT

A joint unit such as for mounting the vehicle control arm of a motor vehicle, is provided with a control arm-side housing (1), in which a pivot pin (2) is mounted pivotably by means of a spheroidal bearing surface (3), wherein the joint unit has a securing unit against the separation of the housing (1) from the pivot pin (2). The securing unit includes a securing bolt (9), arranged within the pivot pin (2) essentially in parallel to the central longitudinal axis of the pivot pin (2) and with a blocking element (12) at a free end. A securing mount (13) is located within the housing (1) or the pivot pin (2) and in this the blocking element (12) is mounted in a contactless manner in the mounted state of the joint unit. The securing mount (13) is part of the securing unit, and the securing bolt (9) is fixed to the component of the joint unit (housing (1) or pivot pin (2)) that is not provided with the securing mount (13). Redundant securing of a joint unit against separation of the housing (1) from the pivot pin (2), which is not visible from the outside and is thus advantageous from both a safety engineering viewpoint and a visual viewpoint is achieved.

20 Claims, 2 Drawing Sheets

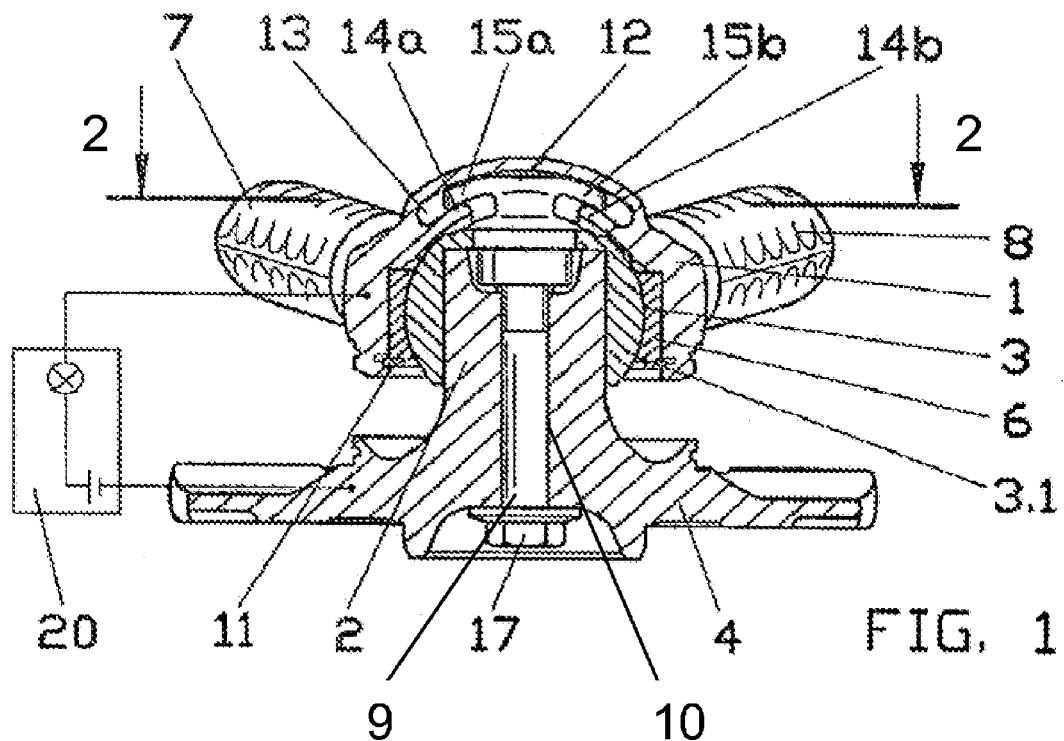
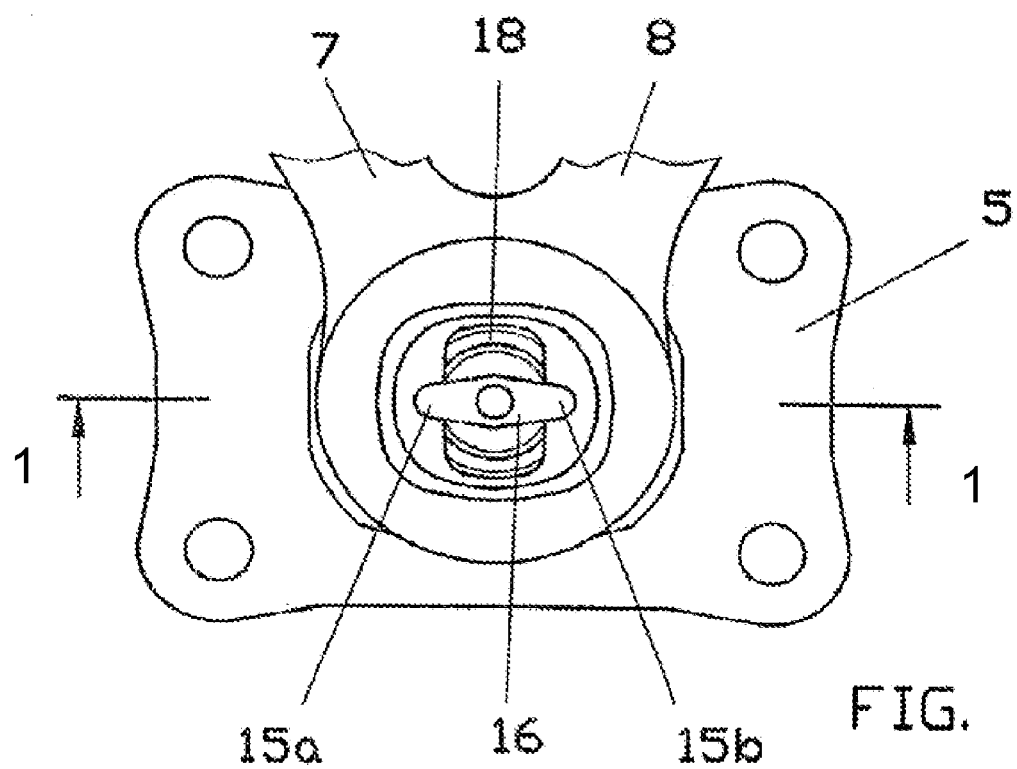

JOINT UNIT, PREFERABLY FOR MOUNTING THE CHASSIS CONTROL ARM OF A MOTOR VEHICLE

CROSS REFERENCE TO RELATED APPLICATIONS

This application is a United States National Phase application of International Application PCT/DE2007/001420 and claims the benefit of priority under 35 U.S.C. §119 of German Patent Application DE 10 2006 039 863.7 filed Aug. 25, 2006, the entire contents of which are incorporated herein by reference.

FIELD OF THE INVENTION

The present invention pertains to a joint unit, preferably for mounting the chassis control arm of a motor vehicle, with a control arm-side housing, in which a pivot pin is mounted pivotably by means of a spheroidal bearing surface, wherein the joint unit has a securing unit against the separation of the housing and the pivot pin.

BACKGROUND OF THE INVENTION

Wheel suspensions in motor vehicles have different bearings and joints in terms of function depending on the requirements. The joints are used, for example, to make possible a relative motion of two components in a plurality of degrees of freedom. Moreover, joint units that possess special damping properties for vibrations introduced via the wheels of the motor vehicle are known as well.

The joint units used in chassis components are predominantly highly stressed safety components, which are designed usually according to the SafeLife principle, i.e., with multiple safety in a reliably operating manner for the entire service life of a motor vehicle. Nevertheless, events or highly unfavorable causal relationships are conceivable, in which total failure of the joint units usually used may occur.

For example, special wear of the bearing shell or of the pivot pin is conceivable, which may occur due to failure of the sealing systems used in such joint units, because dirt or water enters the interior of the joint. Complete separation of the unity between the housing and the pivot pin of the damaged joint unit would be the most serious consequence of such failure of the joint units. Such a case of separation of the essential components of the joint must be ruled out altogether for safety reasons.

Securing units that prevent complete separation of the housing from the pivot pin have become known from the state of the art for preventing such cases, so that a joint thus damaged still has an emergency running function, which offers the possibility for the vehicle to be transferred to the nearest workshop.

For example, DE 10 2004 055 961 A1 discloses a joint unit having the features forming this class, which is provided with a securing unit called a catching device there, in which at least one flexible catching belt or at least one securing strap with a recess is provided, into which recess a catching pin of the housing protrudes in a contactless manner during normal operation. Such a catching device can definitely prevent separation between the housing and the pivot pin, but it is inevitably always arranged in the outer area of the joint unit in question because of its structural dimensions, which are dictated by the design. However, the visual presence of the objectively desirable and necessary securing system causes a joint unit to be subjectively present for the user, which may not necessarily suggest, owing to its special embodiment, the safety of a joint unit, which would be provided with a redundant securing unit invisible from the outside.

SUMMARY OF THE INVENTION

The object of the present invention is therefore to perfect a joint unit of the type of this class such that, on the one hand, emergency running function of the joint unit continues to be guaranteed even in case of the development of complete separation between the housing and the pivot pin and, on the other hand, the securing unit used correspondingly herefor does not entail any conspicuous shape of the joint unit in terms of its structural dimensions.

According to the present invention a securing unit for preventing the separation of the housing and the pivot pin of the joint unit has a securing bolt, which is arranged within the pivot pin essentially in parallel to its central longitudinal axis and is provided with a blocking element at its free end, and a securing mount located within the housing or the pivot pin, in which mount the blocking element is mounted in a contactless manner in the mounted state of the joint unit, wherein the securing bolt is fixed to the component of the joint unit that is not provided with the securing mount (housing or pivot pin).

Contrary to all the solutions of a securing unit that are known from the state of the art, the teaching according to the present invention provides a design solution, which can be fully accommodated within the usual structural dimensions of a joint unit. The special outfitting of such a joint unit with the additional securing unit is no longer visible in this manner from the outside, so that reservations on the part of the users and vehicle owners are no longer to be feared.

Another embodiment of the blocking element makes provisions, for example, for this blocking element to have at least two projections projecting symmetrically over the cross section of the securing bolt. Projections may be designed in the form of an end web at the free end of the securing bolt. The securing bolt is fixed, on the whole, at the housing or pivot pin belonging to it by a screw connection. In addition, other possibilities of fastening are, of course, conceivable as well. The shape of the blocking element in conjunction with the elongated shape of the securing bolt offers a simple possibility of creating an end component that cooperates with the securing mount, has a simple design and can be manufactured in a simple manner, at one free end of the securing bolt.

In conjunction with the special design of the securing bolt, the securing mount has limiting surfaces, which are directed towards the inside of the joint unit and extend behind the above-described blocking element. The securing mount may additionally have an insertion opening directed towards the inside of the joint unit for a securing bolt; the cross section of the insertion opening being essentially rectangular, the greater lateral dimension of the rectangular cross section permitting the passage of the blocking element of the securing bolt through the insertion opening and the other lateral dimension of the rectangular cross section being selected to be smaller than the breadth of the projections of the blocking element. A so-called bayonet connection, in which the securing bolt is turned by an amount of, for example, 90° after being passed through the insertion opening of the securing mount, is formed due to this design, and an axial motion of the bolt is then prevented from occurring by the limiting surfaces present within the securing mount, so that separation between the housing and the securing bolt fastened to the pivot pin will then be prevented from occurring as well.

According to another advantageous embodiment of the joint unit according to the present invention, the housing is made as a cast component, in which the securing mount is fully integrated as a recess. Since the blocking element of the securing bolt provides for a contactless or nearly contactless placement in the securing mount of the housing during normal operation, a recess prepared in the housing within the framework of the manufacture of castings does not advantageously need to be subjected to further processing providing that the corresponding tolerances are complied with.

Moreover, an advantageous variant of the subject of the present invention for special applications provides for manufacturing the housing as a cast component, in which case the securing mount is integrated as a recess and the limiting surfaces with their cooperating function with the blocking element of the securing bolt are inserted as separate sheet metal elements into the recess of the housing. Such an embodiment may bring about a more cost-effective manufacture of the joint unit under certain general conditions.

Since the joint units used are often used in areas of the motor vehicle chassis or steering, which are not accessible to regular visual inspection, it may, moreover, be advantageous to arrange an electronic sensor element, which monitors and indicates the separation of the housing and the pivot pin, between the housing and the pivot pin.

Even though separation of the joint unit is prevented by the embodiment according to the present invention, such a joint unit is damaged, at any rate, to such an extent that replacement must be brought about as soon as possible. This can happen corresponding to the embodiment of the joint unit with a sensor unit as soon as possible after development of the damage by the user of the vehicle being correspondingly notified within the framework of the computer diagnostics usually present in the vehicle monitoring system to drive to a workshop as soon as possible to fix the problem.

Various embodiment variants may be used for embodying the electronic sensor element. Exemplary embodiments of the subject of the present invention will be explained in more detail below on the basis of the drawings attached. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 1 is a sectional view through a first exemplary embodiment of the joint unit according to the present invention;

FIG. 2 is a top view of the joint unit according to FIG. 1 corresponding to view 2-2.

DESCRIPTION OF THE PREFERRED EMBODIMENTS

Figure 3:
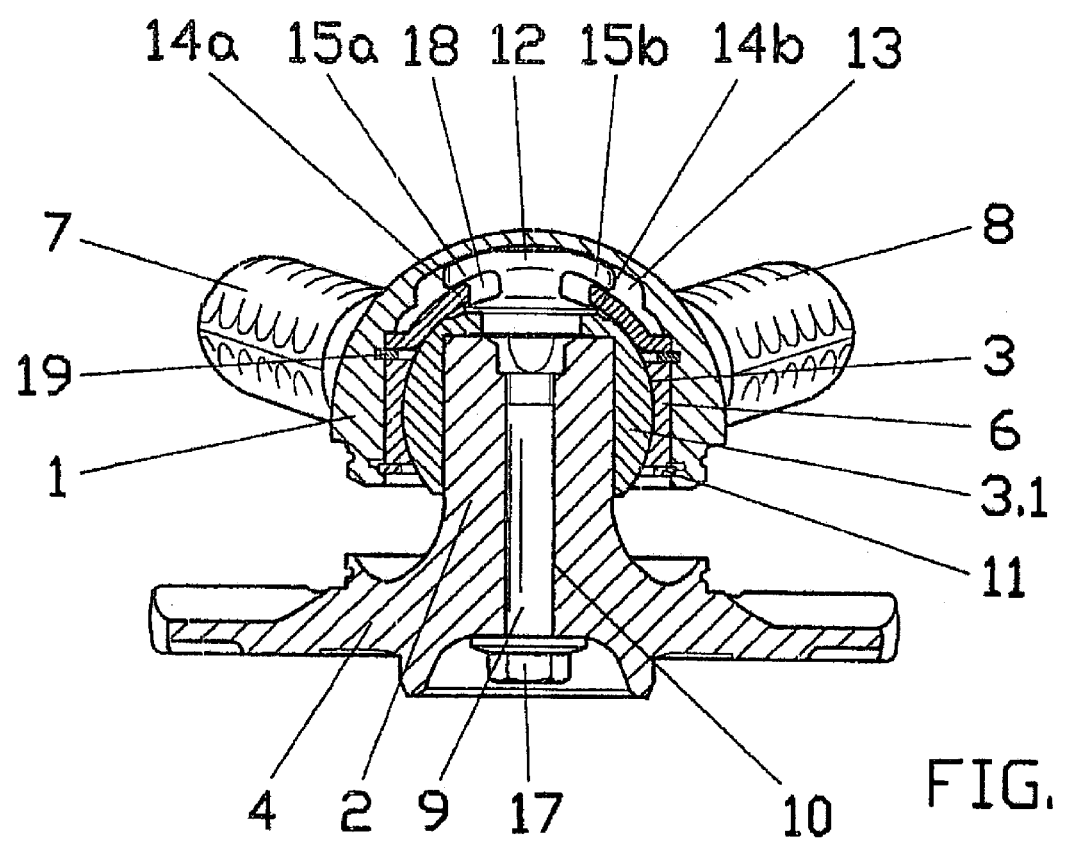
FIG. 3 is a sectional view of another embodiment variant of the joint unit according to the present invention.

Referring to the drawings in particular, the essential features according to the present invention are explained with reference to an exemplary embodiment and an embodiment variant according to the present invention. The exemplary embodiment is shown in FIG. 1, and an embodiment variant is shown in FIG. 3. Uniform reference numbers will be used below in the individual figures insofar as they are used for identical components or assembly units.

The joint unit in FIG. 1 has a housing 1, with which the connection area of a control arm pair 7, 8 of a steering triangle for a motor vehicle is made integrally in one piece.

In the design being shown as an embodiment open on one side, housing 1 has an inner cavity, into which a bearing shell 6 is inserted. The bearing shell makes possible within the joint unit a vibration-damping function, which at the same time possesses sliding properties. Bearing shell 6 receives, when viewed towards the interior of the joint, the spheroidal bearing surface 3 of a joint ball 3.1. Joint ball 3.1 is fixed on a pivot pin 2. A retaining ring 11 is used to secure the bearing shell 6 against axial migration out of the opening of housing 1.

The pivot pin 2 is part of a mount 4, whose component is a connecting flange 5, by means of which the joint unit is usually screwed to an axle-side bracket.

A securing unit, which comprises essentially a securing bolt 9, which is mounted in a hole 10 of the pivot pin 2, as well as a securing mount 13, is located according to the present invention in the interior of the joint unit shown. The securing bolt 9 passes through the entire pivot pin 2 including the axle-side mount 4 and has a blocking element 12 at its upper free end facing the housing 1. The blocking meshes with the securing mount 13 located within the housing 1. The securing mount 13 is part of the upper part of housing 1 and has two limiting surfaces 14a and 14b designed as dogs projecting into the securing mount on its underside facing the pivot pin 2 in the exemplary embodiment being shown. The limiting elements 14a and 14b as well as the top side of the securing mount 13, which has a chamber-like design, thus form a gap, which is engaged by the blocking element 12 such that motion of the securing bolt 9 in both the upward direction and the downward direction is prevented. Corresponding to an advantageous embodiment, the blocking element 12 is provided for this purpose with at least two projections 15a and 15b projecting symmetrically over the cross section of the securing bolt 9. The two projections 15a and 15b form the shape of an end web 16, as this appears especially from the top view in FIG. 2.

The securing bolt, which is provided with the end web 16 at one end, is made, in principle, of a hexagon head screw 17, to the upper end of which, which faces away from the screw head, an attachment with the blocking element 12 is screwed onto the thread of the hexagon head screw. The securing bolt 9 is thus fixed within the pivot pin 2.

As is apparent from FIGS. 1 and 3, it is guaranteed by the special design embodiment of the securing bolt 11 with its blocking element 12 and with the securing mount 13 cooperating with the blocking element 12 that separation of the housing 1 from the pivot pin 2, for example, as a consequence of increased wear of the joint ball 3.1 or of the bearing shell 6 lifting off of the housing 1 from the pivot pin 2 is ruled out. The dimensions of the blocking element 12, which is mounted in the securing mount 13, are selected in the usual operating state of the joint unit such that the adjoining components do not touch one another and all directions of motion, which the joint unit permits, are made available between the pivot pin and the housing via the spheroidal bearing surface 3 in conjunction with the bearing shell 6.

It additionally becomes clear from FIG. 2 that the securing mount 13 has an insertion opening 18 for the securing bolt 9 on its side directed towards the inside of the joint unit in the area of the limiting elements 14a and 14b. The insertion opening 18 has an essentially rectangular cross section, and the larger lateral dimension of the cross section is selected to be such that the blocking element 12 or the end web 16 forming this blocking element can be passed through the insertion opening in the corresponding, correctly rotated position. If the end web 16 is passed through the insertion opening 18, the securing bolt 9 is rotated by 90°, so that the undersides of the projections 15a and 15b lie over the limiting elements 14a and 14b. Axial motion of the pivot pin 2 is ruled out in this position of the blocking element 12 or is possible only to the extent of the distance between the projections 15a and 15b and the top side of the limiting surfaces 14a and 14b. The embodiment variant shown makes possible a closed shape of the housing 1 on its top side and at the same time facilitates the corresponding mounting of the securing bolt 9.

The embodiment variant shown additionally in FIG. 3 of the joint unit according to the present invention differs from the view in FIG. 1 in respect to the embodiment of the limiting elements 14a and 14b. Housing 1 is designed as a cast component in FIG. 1, and the limiting elements 14a and 14b belonging to the securing mount 13 are made in one piece with the housing 1, so that the securing mount 13 is fully integrated as a recess in the housing.

In the embodiment according to FIG. 3, housing 1 is likewise designed as a cast component, and the securing mount 13 is likewise integrated as a recess in housing 1. However, the limiting elements 14a and 14b are part of a separate sheet metal element in this embodiment, which sheet metal element is clamped within the housing between a projection and a retaining ring 19.

To enable the user of the vehicle to nevertheless recognize a bearing unit protected by the securing unit against separation of the housing 1 from the pivot pin 2 as defective, it is schematically indicated in FIG. 1 that an electronic sensor element 20 may be arranged between the housing 1 and the pivot pin 2. The sensor element 20 is designated as a so-called "black box" in the view in FIG. 1, and it may be made, on the one hand, of a sensor for the axial motion between the housing 1 and the pivot pin 2, which is possible albeit slight, and a corresponding electronic analysis unit may at the same time be associated with the entire on-board electronic system of modern motor vehicles. At any rate, the user of the vehicle has the possibility due to this auxiliary equipment to detect the failure of the joint unit and to bring about as a consequence the replacement of the corresponding defective component as soon as possible.

While specific embodiments of the invention have been shown and described in detail to illustrate the application of the principles of the invention, it will be understood that the invention may be embodied otherwise without departing from such principles.

The invention claimed is:

1. A joint unit for mounting a chassis control arm of a motor vehicle, the joint unit comprising:
   a pivot pin with a spheroidal bearing surface;
   a control arm-side housing in which said pivot pin is pivotably accommodated by means of said spheroidal bearing surface; and
   a securing unit for securing against separation of the housing from the pivot pin, said securing unit having a securing bolt arranged within said pivot pin, essentially in parallel to a central longitudinal axis of said pivot pin, said securing bolt having a blocking element at one free end, wherein a securing mount is located within housing and in which said blocking element is mounted in a contactless manner in a mounted state of the joint unit, wherein said securing bolt is fixed to said pivot pin.

2. A joint unit in accordance with claim 1, wherein said blocking element has at least two projections projecting symmetrically over a cross section of said securing bolt.

3. A joint unit in accordance with claim 2, wherein said projections comprise an end web at the free end of said securing bolt.

4. A joint unit in accordance with claim 2, wherein said securing mount has an insertion opening directed towards the inside of the joint unit for said securing bolt, a cross section of said insertion opening being essentially rectangular, wherein a larger lateral dimension of said insertion opening makes it possible to pass through said blocking element of said securing bolt and the other lateral dimension of the cross section is selected to be smaller than the breadth of the projections of said blocking element.

5. A joint unit in accordance with claim 1, wherein said securing bolt is designed as a hexagon head screw.

6. A joint unit in accordance with claim 1, wherein said securing mount has limiting elements, which are directed towards the inside of the joint unit and extend under said blocking element.

7. A joint unit in accordance with claim 6, wherein said housing is designed as a cast component, wherein said securing mount is integrated as a recess and wherein said limiting surfaces are part of a separate sheet metal element, which is inserted into the recess of housing.

8. A joint unit in accordance with claim 1, wherein said housing is designed as a cast component, in which said securing mount is fully integrated as a recess.

9. A joint unit in accordance with claim 1, further comprising an electronic sensor element, which monitors and transmits a separation of said housing and said pivot pin, is arranged between said housing and said pivot pin.

10. A chassis control arm joint unit comprising:
    a pivot pin with a spheroidal portion having a spheroidal portion with a spheroidal bearing surface;
    a control arm-side housing, said spheroidal portion of said pivot pin being mounted in said housing for pivoting movement relative to said housing;
    a securing bolt arranged within said pivot pin extending essentially along a central longitudinal axis of said pivot pin;
    a blocking element at a free end of said securing bolt; and
    a securing mount connected to said housing, said blocking element being mounted in a contactless manner in said securing mount, wherein said securing bolt is fixed at said pivot pin.

11. A joint unit in accordance with claim 10, wherein said blocking element has at least two projections projecting symmetrically over a cross section of said securing bolt.

12. A joint unit in accordance with claim 11, wherein said projections comprise an end web at the free end of said securing bolt.

13. A joint unit in accordance with claim 11, wherein said securing mount has an insertion opening with said projections of said blocking element on one side of said opening and a remainder of said securing bolt on an opposite side of said opening, wherein said opening is dimensioned to allow passage of said projections through said opening during assembly of the joint and to prevent passage of said projections through said opening after assembly.

14. A joint unit in accordance with claim 13, wherein said housing comprises a cast component with said securing mount fully integrated with said housing and defining a recess.

15. A joint unit in accordance with claim 10, wherein said securing bolt comprises a bolt portion with a hexagon head screw and an end facing away from said head screw having an attachment provided with said blocking element.

16. A joint unit in accordance with claim 10, wherein said securing mount has limiting elements directed towards the inside of the joint unit and extending under said blocking element.

17. A joint unit in accordance with claim 16, wherein said housing comprises a cast component, wherein said securing mount is integrated as a recess and wherein said limiting surfaces comprises a separate sheet metal element, which is inserted into said recess of housing.

18. A joint unit in accordance with claim 10, further comprising an electronic sensor element for monitoring a separation of said housing and said pivot pin, said sensor being arranged between said housing and said pivot pin.

19. A chassis control arm joint unit comprising:

a pivot pin comprising a spheroidal portion, said spheroidal portion comprising a spheroidal bearing surface;

a control arm-side housing, said spheroidal portion of said pivot pin being mounted in said housing for pivoting movement relative to said housing;

a securing bolt arranged within said pivot pin extending essentially along a central longitudinal axis of said pivot pin;

a blocking element at a free end of said securing bolt; and a securing mount connected to said housing, said blocking element being mounted in said control arm-side housing with at least a portion of said blocking element in contact with said securing mount such that said pivot pin does not contact said control arm-side housing, wherein said securing bolt is fixed at said pivot pin.

20. A joint unit in accordance with claim 19, wherein said blocking element has at least two projections projecting symmetrically over a cross section of said securing bolt.

* * * * *